(12) United States Patent
Altshuler et al.

(10) Patent No.: US 10,884,199 B2
(45) Date of Patent: Jan. 5, 2021

(54) OPTICAL ALIGNMENT OF FIBER-OPTIC ROTARY JOINT ASSEMBLY

(71) Applicant: CANON U.S.A., INC., Melville, NY (US)

(72) Inventors: Alexander Altshuler, Cambridge, MA (US); Daisuke Yamada, Cambridge, MA (US)

(73) Assignee: Canon U.S.A., Inc., Melville, NY (US)

( * ) Notice: Subject to any disclaimer, the term of this patent is extended or adjusted under 35 U.S.C. 154(b) by 0 days.

(21) Appl. No.: 16/243,934

(22) Filed: Jan. 9, 2019

(65) Prior Publication Data

US 2019/0146163 A1    May 16, 2019

Related U.S. Application Data

(62) Division of application No. 15/658,936, filed on Jul. 25, 2017.

(51) Int. Cl.
| G02B 6/42 | (2006.01) |
| G02B 6/38 | (2006.01) |
| G02B 6/32 | (2006.01) |
| G02B 6/36 | (2006.01) |
| G02B 7/00 | (2006.01) |

(52) U.S. Cl.
CPC ............ *G02B 6/4206* (2013.01); *G02B 6/32* (2013.01); *G02B 6/3604* (2013.01); *G02B 6/3873* (2013.01); *G02B 6/4234* (2013.01); *G02B 6/4256* (2013.01); *G02B 7/00* (2013.01)

(58) Field of Classification Search
CPC ............... G02B 6/42; G02B 6/32; G02B 6/38

USPC .......................................... 385/136
See application file for complete search history.

(56) References Cited

U.S. PATENT DOCUMENTS

| 4,265,511 | A  | * | 5/1981  | Nicia ....................... G02B 6/32 385/33 |
| 4,451,115 | A  |   | 5/1984  | Nicia et al. |
| 5,265,079 | A  | * | 11/1993 | Getreuer ............... G11B 5/5526 359/813 |
| 5,859,947 | A  | * | 1/1999  | Kiryuscheva ........ G02B 6/3803 356/153 |
| 6,263,133 | B1 | * | 7/2001  | Hamm ..................... G02B 6/32 385/15 |

(Continued)

FOREIGN PATENT DOCUMENTS

| JP | S56-018911 U | 2/1981 |
| JP | 2003523540 A | 8/2003 |

(Continued)

*Primary Examiner* — Kaveh C Kianni
(74) *Attorney, Agent, or Firm* — Canon U.S.A., Inc. IP Division

(57) ABSTRACT

A first optical axis of a first optical component is caused to be at a first angle with respect to a first precision surface of the first optical component. A second optical axis of a second optical component is aligned to be at a second angle to a second flat surface of the second optical component. The second angle is equal to or derived from the first angle. The first and second flat surfaces are caused to directly face each other to allow only sliding motion between the first and second flat surfaces. The sliding motion is performed between the first and second flat surfaces until the first and second optical axes are sufficiently collinear.

14 Claims, 5 Drawing Sheets

(56) References Cited

U.S. PATENT DOCUMENTS

| | | | | |
|---|---|---|---|---|
| 6,360,032 B1* | 3/2002 | Berger | G02B 6/266 | 385/140 |
| 6,687,010 B1* | 2/2004 | Horii | G01B 9/0201 | 356/479 |
| 6,773,170 B1* | 8/2004 | Georgiev | G02B 6/264 | 385/90 |
| 6,921,215 B2* | 7/2005 | Catchmark | G02B 6/32 | 385/137 |
| 7,239,776 B2* | 7/2007 | Oosterhuis | G02B 6/3604 | 385/25 |
| 8,691,584 B2* | 4/2014 | Durack | G01N 33/48 | 422/73 |
| 8,985,870 B2* | 3/2015 | Ryudo | H01S 5/026 | 385/88 |
| 9,233,453 B1* | 1/2016 | Samuels | B24B 7/22 | |
| 2002/0033941 A1* | 3/2002 | Seward | G01B 11/27 | 356/153 |
| 2002/0146227 A1* | 10/2002 | Suzuki | G02B 6/32 | 385/134 |
| 2003/0086144 A1* | 5/2003 | Chou | G02B 6/278 | 359/246 |
| 2003/0174419 A1* | 9/2003 | Kindler | G02B 6/3636 | 359/819 |
| 2003/0206699 A1* | 11/2003 | Schmitt | G02B 6/2746 | 385/52 |
| 2005/0053113 A1* | 3/2005 | Clary | G02B 7/003 | 372/108 |
| 2005/0112541 A1* | 5/2005 | Durack | C12N 5/0612 | 435/2 |
| 2007/0002911 A1* | 1/2007 | Sharma | G02B 7/003 | 372/29.022 |
| 2007/0217736 A1* | 9/2007 | Zhang | G02B 6/3604 | 385/26 |
| 2007/0268805 A1* | 11/2007 | Popp | G02B 6/3604 | 369/110.04 |
| 2011/0310383 A1* | 12/2011 | Masson | G01N 21/553 | 356/319 |
| 2012/0148192 A1* | 6/2012 | Nakanishi | G02B 6/4206 | 385/33 |
| 2012/0217391 A1* | 8/2012 | Shichi | H01J 27/26 | 250/306 |
| 2014/0142436 A1* | 5/2014 | Hutchins | A61B 5/0035 | 600/478 |
| 2016/0187609 A1* | 6/2016 | Jin | G02B 7/004 | 211/13.1 |
| 2017/0031110 A1* | 2/2017 | Bhagavatula | G02B 6/3898 | |
| 2017/0143196 A1* | 5/2017 | Liang | A61B 1/00018 | |

FOREIGN PATENT DOCUMENTS

| | | | | |
|---|---|---|---|---|
| JP | 2017016058 A | 1/2017 | | |
| JP | 2017053773 A | 3/2017 | | |
| WO | WO 02/070987 A1 * | 12/2002 | | G01B 11/27 |

* cited by examiner

OPTICAL ALIGNMENT OF FIBER-OPTIC ROTARY JOINT ASSEMBLY

CROSS-REFERENCE TO RELATED APPLICATIONS

This is a divisional application of U.S. patent application Ser. No. 15/658,936 filed on Jul. 25, 2017, which is hereby incorporated by reference herein in its entirety.

BACKGROUND OF THE INVENTION

Field of the Invention

The invention relates to optical alignment apparatus and method and more specifically provides exemplary optical alignment of a fiber-optic rotary joint assembly.

Description of the Related Art

Recently, demand for communication using fiber optics has increased significantly due to its superior performance and cost effectiveness. One particular application is the transmission of optical signals with rotating devices. A fiber optic rotary joint (FORJ) is a device that allows the transmission of an optical signal while rotating along the fiber optical axis. A typical FORJ device includes at least two optical fibers each terminated with a collimator on the joint end. One fiber is stationary and the other fiber is rotating.

To minimize signal loss, the axes of the collimators facing each other should be aligned precisely in yaw and pitch angular as well as x and y translational orientations to each other. For both stationary and rotating fibers, this alignment would require adjustments having 8 degrees of freedom in total. Such an alignment procedure is time consuming and is undesirable from a manufacturing standpoint.

Thus, there is a need for new optical alignment methods and apparatus to overcome the problems as discussed above.

SUMMARY OF THE INVENTION

In order to overcome at least some of the deficiencies and issues as discussed above, exemplary embodiments are provided herein for optical alignment. Some embodiments provide a method, the method comprising: aligning a first optical axis of a first optical component to be at a first angle with respect to a first precision surface of the first optical component; aligning a second optical axis of a second optical component to be at a second angle to a second precision surface of the second optical component, the second angle being equal to or derived from the first angle; causing the first and second precision surfaces to directly face each other to allow only sliding motion between the first and second precision surfaces; and performing the sliding motion between the first and second precision surfaces until the first and second optical axes are sufficiently collinear.

Also provided in some embodiments is a non-transitory storage medium containing instructions that, when executed by a processor, cause the processor to perform operations comprising: causing a first optical axis of a first optical component to be at a first angle with respect to a first precision surface of the first optical component; aligning a second optical axis of a second optical component to be at a second angle to a second precision surface of the second optical component, the second angle being equal to or derived from the first angle; causing the first and second precision surfaces to directly face each other to allow only sliding motion between the first and second precision surfaces; and performing the sliding motion between the first and second precision surfaces until the first and second optical axes are sufficiently collinear.

In some embodiments, there is provided an apparatus and a method of use that provide a first optical component having a first optical axis, a first optical axis adjuster, and a first base element having a first precision surface; and a second optical component having a second optical axis, a second optical axis adjuster, and a second base element having a second precision surface adapted to mate slidingly with the first precision surface with a predetermined range of motion, wherein the first optical axis adjuster is adapted to adjust at least one of the pitch and yaw angles and the translational displacements of a collimator inside the first optical axis adjuster for the first optical axis to assume a first specific geometric relationship with the first precision surface, wherein the second optical axis adjuster is adapted to adjust at least one of the pitch and yaw angles of a collimator inside the second optical axis adjuster for the second optical axis to assume a second specific geometric relationship with the second precision surface.

In some embodiments, there is provided an apparatus comprising: a first optical component having a first optical axis adjuster, and a first base element having a first precision surface; and a second optical component having a second optical axis adjuster, and a second base element having a second precision surface adapted to mate slidingly with the first precision surface with a predetermined range of motion. The first optical axis adjuster can be adapted to adjust at least one of the pitch and yaw angles and the translational displacements of a collimator inside the first optical axis adjuster for the first optical axis to assume a first specific geometric relationship with the first precision surface. The second optical axis adjuster can be adapted to adjust at least one of the pitch and yaw angles of a collimator inside the second optical axis adjuster for the second optical axis to assume a second specific geometric relationship with the second precision surface. The second specific geometric relationship parameters can be derived from the first specific geometric relationship parameters and from mating specifics of the first precision surface with the second precision surface. The predetermined range of motion between the first precision surface and the second precision surface can be sufficient to bring the first optical axis in the collinear geometric relation with the second optical axis while the first precision surface is mated with the second precision surface.

Further features of the disclosure will become apparent from the following description of exemplary embodiments with reference to the attached drawings.

DESCRIPTION OF THE EMBODIMENTS

Figure 1:
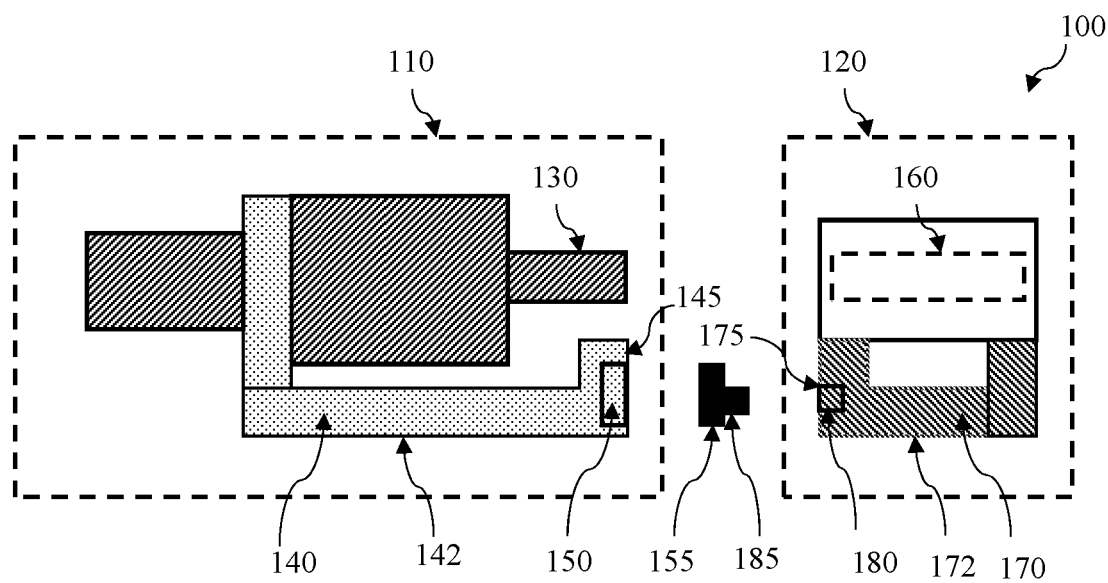
FIG. 1 is a diagram illustrating a fiber-optic rotary joint assembly.

FIG. 1 is a diagram illustrating a fiber-optic rotary joint (FORJ) assembly 100. The diagram shows a side view of the FORJ assembly 100. The FORJ assembly 100 includes a first optical component 110, a second optical component 120, first adjustment key 155 and second adjustment key 185.

In this exemplary embodiment, the first optical component 110 is a rotator or a rotating unit. It includes a first optical axis adjuster 130, a base element 140, and a first key slot 150. The first optical component 110 may include more or less than the above components. The first optical axis adjuster 130 includes components (e.g., screws) to adjust the pitch and yaw angles and the horizontal (X) and vertical (Y) displacements of a collimator located inside the first optical axis adjuster 130. The base element 140 provides support for the first optical axis adjuster 130 and the collimator. It has a bottom surface 142 and a first flat surface 145. The first flat surface 145 stands upright and is perpendicular to the bottom surface 142. The first key slot 150 is a hollow or opening region or portion within the base element 140. The first key slot 150 is configured to mate with the first adjustment key 155; i.e., the first key slot 150 fits the first adjustment key 155 with additional clearance to allow the key to move during alignment.

The second optical component 120 is a stator or a stationary unit. It includes a second optical axis adjuster 160, a base element 170, and a second key slot 180. The second optical component 120 may include more or less than the above components. The second optical axis adjuster 160 includes components (e.g., screws) to adjust the pitch and yaw angles of a collimator located inside the second optical axis adjuster 160. The base element 170 provides support for the second optical axis adjuster 160 and the collimator. It has a bottom surface 172 and a second flat surface 175. The second flat surface 175 stands upright and is perpendicular to the bottom surface 172. The second key slot 180 is a hollow or opening region or portion within the base element 170. The second key slot 180 is configured to mate with the second adjustment key 185; i.e., the second key slot 180 fits the second adjustment key 185 with additional clearance to allow the key to move during alignment.

The first and second optical components 110 and 120, respectively, are configured to be compatible with each other for alignment. For example, the first and second flat surfaces 145 and 175, respectively, are parallel when they directly face each other. The first and second key slots 150 and 180, respectively, are orthogonal with respect to each other. If the first key slot 150 is horizontal then the second key slot 180 is vertical. If the first key slot 150 is vertical then the second key slot 180 is horizontal. The first and second adjustment keys 155 and 185 follow the directions of the corresponding first and second key slots 150 and 180, respectively, and joined rigidly together in an orthogonal orientation.

While described above as first and second flat surfaces 145 and 175, in some embodiments, the first and second flat surfaces 145 and 175 are precision flat surfaces. In some other embodiments there are first and second surfaces that are precision surfaces that are not necessarily flat, as long as they are adapted for sliding relative motion (e.g., they both can be spherical surfaces or cylindrical surfaces).

Figure 2A:
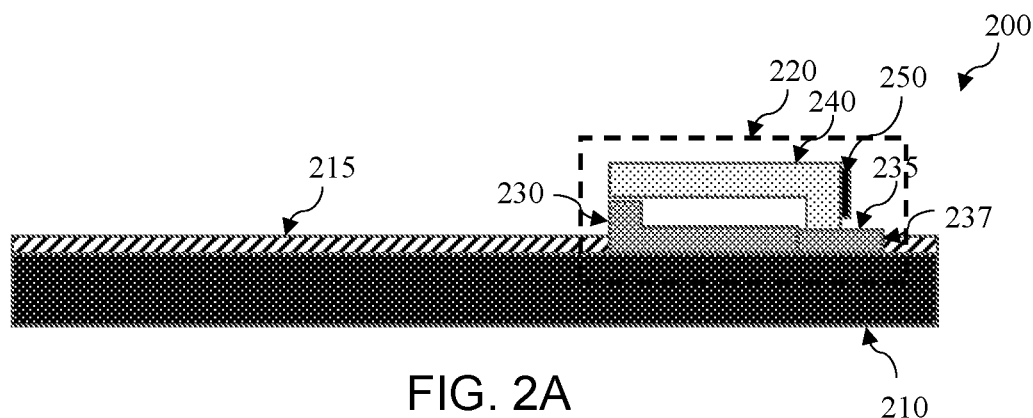
FIG. 2A is a diagram illustrating an alignment fixture assembly having a mount stage at a proximal position.

FIG. 2A is a diagram illustrating an alignment fixture 200 having a mount stage at a proximal position. The alignment fixture 200 includes a base 210, a straight rail 215, and a mount stage 220. The base 210 provides support for the entire alignment process. It has a precision flat surface on which the mount stage is moved. The straight rail 215 provides a guide for the mount stage 220 to move in a straight line from the proximal position to the distal position. The proximal and the distal positions refer to the positions at the two ends of the alignment fixture 200. The proximal position is the position closest to the first or second optical components 110 or 120 when it is clamped to the alignment fixture 200. The distal position is the position farthest to the first or second optical components no or 120 when it is clamped to the alignment fixture 200.

The mount stage 220 provides a mechanism to hold the first and second optical components 110 and 120 in place during the alignment procedure. It also provides a means to decompose a single alignment procedure based on 8 degrees of freedom into three sequential alignment procedures each with much less degrees of freedom. The mount stage 220 includes a mount base 230, a stopper 235, a slider 240, and a position sensitive detector (PSD) 250. The mount stage 220 may include more or less than the above components.

The mount base 230 provides support for the slider 240 and interface to the bottom and side movements. It has a bottom surface that faces the surface of the base 210 to allow a precision movement of the mount stage 220 between the proximal and distal positions. It also has a side surface that mates with the straight rail 215 so that it can move between the proximal and distal positions in a straight line. The stopper 235 has a precision flat surface 237 which is perpendicular to the horizontal or bottom surface. The precision flat surface 237 is a mating surface for the first and second optical components 110 and 120 during the first two steps of the optical alignment. During the alignment of the first optical component and the alignment of the second optical component, the stopper 235 is secured in place. The slider 240 slides horizontally to accommodate the different clearances of the surfaces of the first and second optical components as will be explained later. The PSD 250 is attached to the upright surface of the slider 240. It is used to record the positions of the spots of the light incident on its surface. As will be explained later, these spot positions will be used to determine the angles between the first optical axis and the first flat surface during alignment.

Figure 2B:
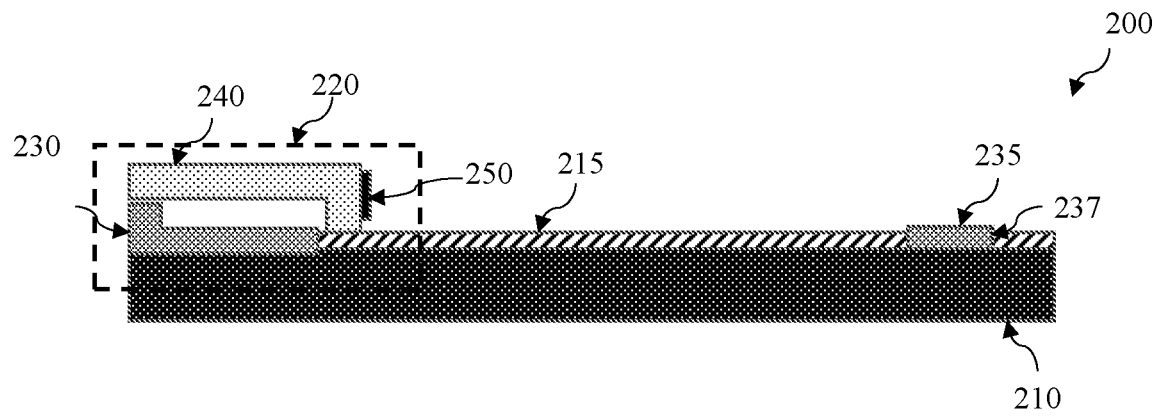
FIG. 2B is a diagram illustrating an alignment fixture assembly having a mount stage at a distal position.

FIG. 2B is a diagram illustrating the alignment fixture 200 having the mount stage 220 at the distal position. FIG. 2B shows the same components as in FIG. 2A and therefore their descriptions will be omitted. The difference between FIGS. 2A and 2B is the mount stage 220 (except the stopper 235) is moved from the proximal position (in FIG. 2A) to the distal position (in FIG. 2B).

The movement of the mount stage 220 from the proximal position to the distal position is to allow the PSD 250 to record the spot positions of a collimated light through the optical component, which in turn gives measurement data to calculate the angle formed by the optical axis with the flat surface.

The overall optical alignment includes three steps. In the first step, the first optical axis of the first optical component 110 is caused to be at a first angle with respect to the first flat surface 145 of the first optical component 110. In this step, the optical axis of the rotational unit should be aligned coincident with its axis of rotation.

In the second step, a second optical axis of the second optical component 120 is aligned to be at a second angle to the second flat surface 175 of the second optical component 120. In one embodiment, this angle may range from 45 degrees to 90 degrees.

After the first two steps, the two optical axes of the two optical components 110 and 120 have been aligned to be parallel with each other, leaving only the horizontal and vertical translational alignments to be performed. This is performed in the third step.

In the third step, the first and second flat surfaces are brought to directly face each other to allow only sliding motion between them. Thereafter, the sliding motion between the first and second flat surfaces is performed until the first and second optical axes are sufficiently collinear. At the end of the third step, the entire optical alignment of the FORJ assembly 100 is completed.

Figure 3A:
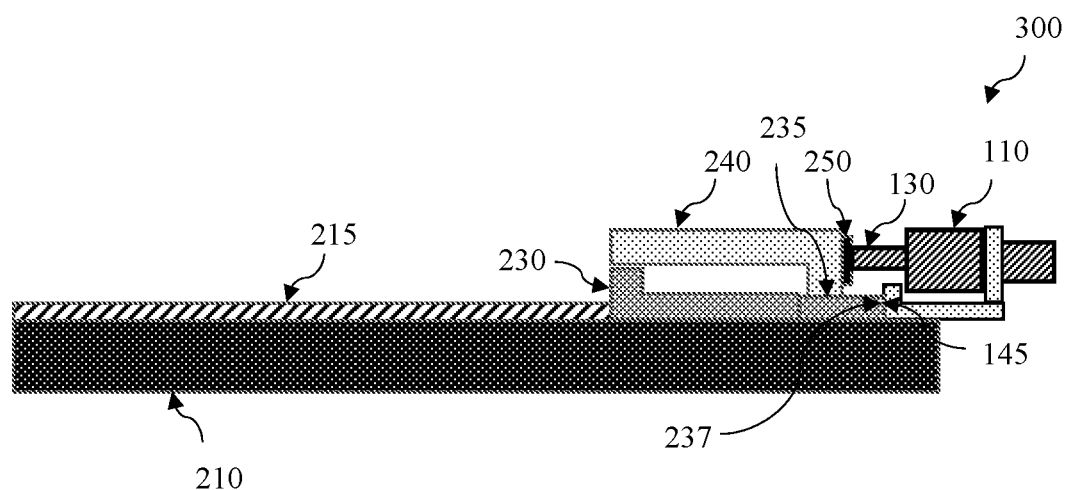
FIG. 3A is a diagram illustrating alignment of a first optical component at the proximal position.

FIG. 3A is a diagram illustrating alignment 300 of the first optical component 110 at the proximal position in the first step. The stopper 235 is secured at a position that accommodates the placement of the first optical component 110. The first optical component 110 is placed at the position of the stopper 235 such that the first flat surface 145 is placed against the surface 237 of the stopper 235. At this position, the first optical axis adjuster 130 points directly to the PSD 250. The goal of this first step is to align the first optical axis of a collimated beam, to its actual axis of rotation in both transverse (horizontal and vertical) and both angular (pitch and yaw) directions. This can be achieved by emitting light through the collimator in the adjuster 130 and recording the spot positions of the incident light on the PSD 250 as the mount stage 240 (and the PSD 250) is moved from the proximal position to the distal position while the fiber is rotated a full revolution. This full revolution corresponds to the translational alignment.

Figure 5:
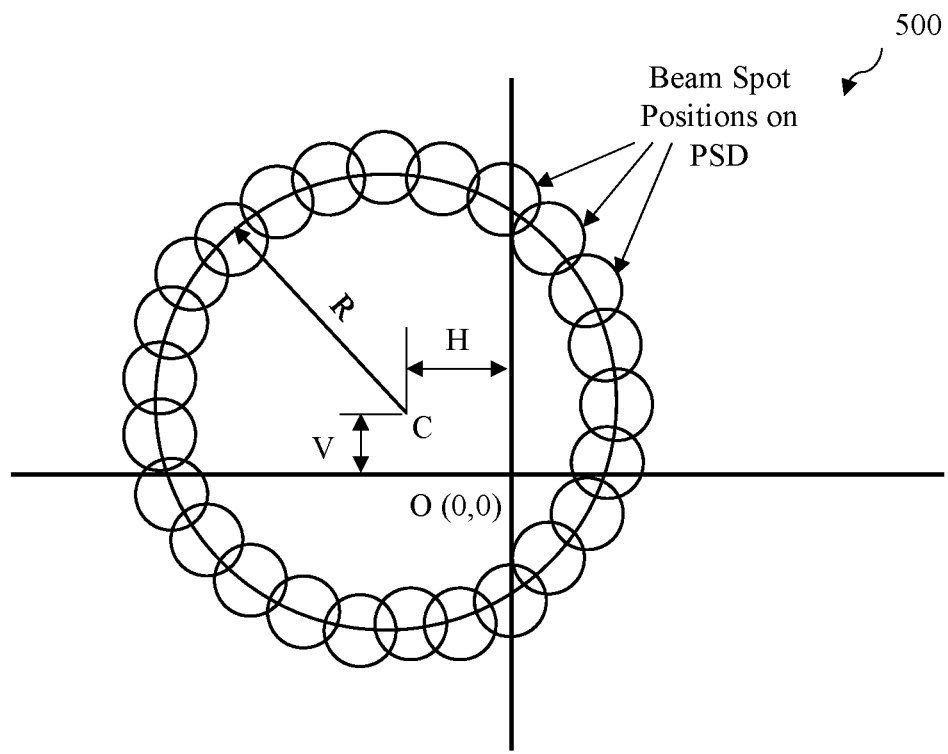
FIG. 5 is a diagram illustrating a spot positions recorded by a Position Sensitive Detector (PSD).

FIG. 5 shows how the angle is determined in the first step as discussed above. At the proximal position the PSD 250 is translated within stage 220 in a plane perpendicular to the optical axis to bring the rotational center C to the coordinate center point O (0,0) bringing to V=0 and H=0. The goal of adjustment in this position is to minimize radius R, where R is the radius of the trace of the spots positions on the PSD as the collimator is rotated. Ideally, the adjustment brings R to, or substantially to 0.

Figure 3B:
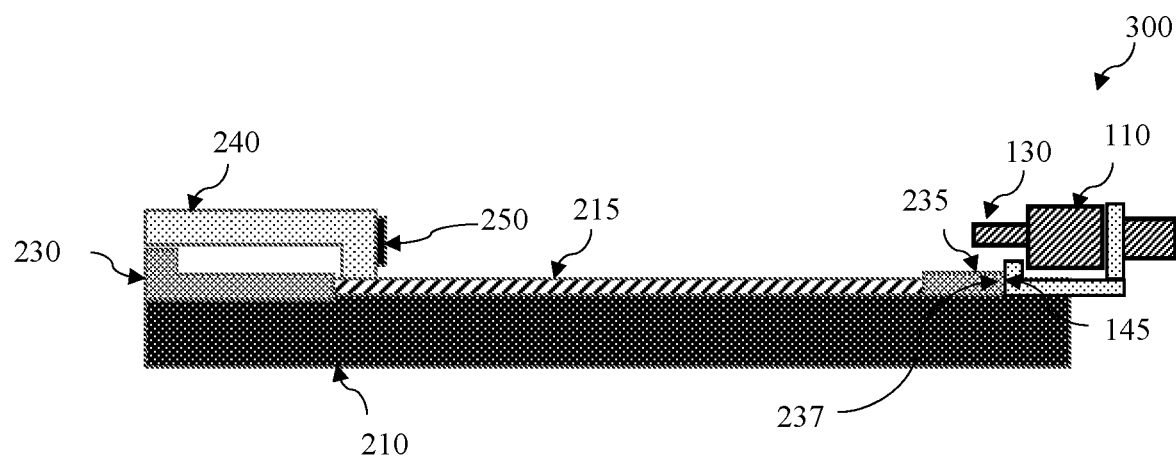
FIG. 3B is a diagram illustrating alignment of a first optical component at the distal position.

FIG. 3B is a diagram illustrating alignment 300 of the first optical component 110 at the distal position. The entire mount stage 220 is moved to the distal position along the precision rail 215 without readjusting position of the PSD 250 on it. The goal of adjustment in this position is again to minimize radius R, ideally bringing it to R=0. After that measurements of H and V may be taken which define the first angle with respect to the precision flat surface 145.

Figure 4A:
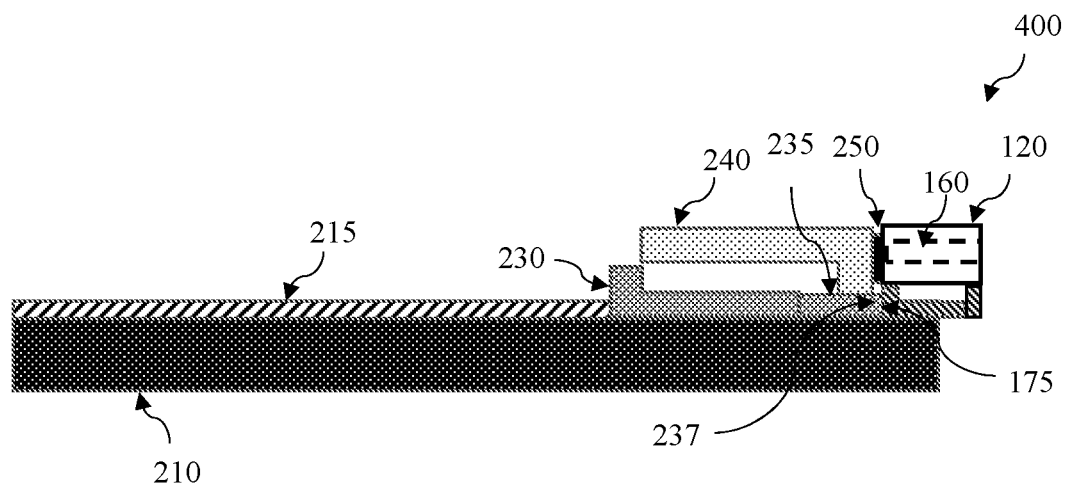
FIG. 4A is a diagram illustrating alignment of a second optical component at the proximal position.

FIG. 4A is a diagram illustrating alignment 400 of the second optical component at the proximal position. FIG. 4A is similar to FIG. 3A except that instead of the first optical component 110 is clamped to the alignment fixture, the second optical component 120 is used. The second flat surface 175 is placed to face directly the surface 237 of the stopper 235. Note that the geometries of the first and second optical components may be different, for example, the length of the first optical component 110 may be longer than the length of the second optical component 120. Therefore, in order the second optical axis adjuster 160 to directly face the PSD 250 at the proximal position, the slider 240 has to be moved toward the second optical component 120 until the PSD 250 touches the second optical axis adjuster 160.

Figure 4B:
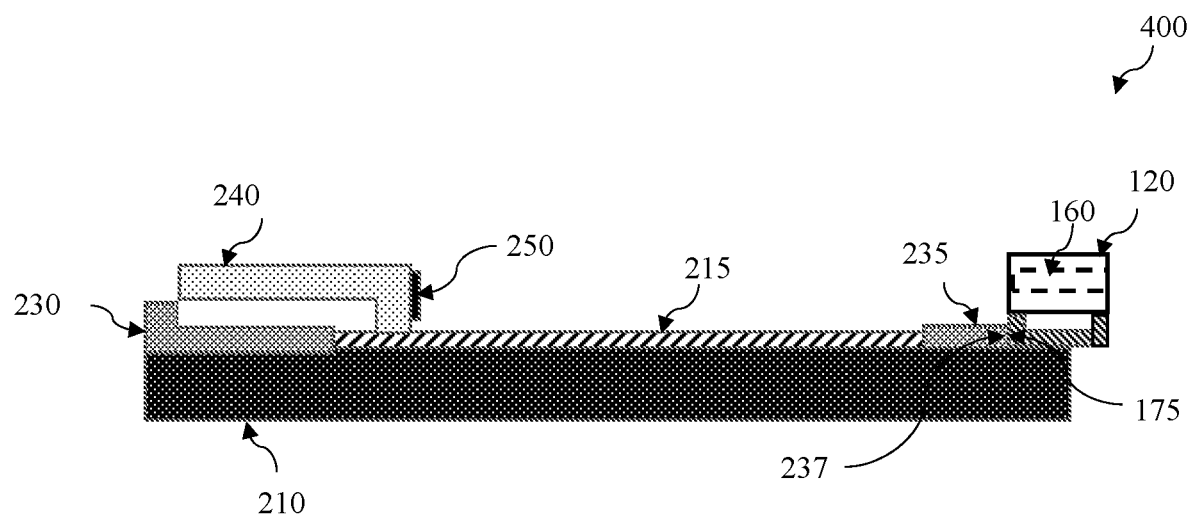
FIG. 4B is a diagram illustrating alignment of a second optical component at the distal position.

FIG. 4B is a diagram illustrating alignment 400 of the second optical component at the distal position. FIG. 4B is similar to FIG. 3B except that instead of the first optical component 110, the second component 120 is secured to the alignment fixture. At the start of this alignment step the PSD 250 should be positioned to preferably yield beam spot at 0, 0 position at the proximal sensor portion and then the collimator 160 adjusted to H, −V at the distal sensor position.

FIG. 5 is a diagram illustrating a spot position recorded by a Position Sensitive Detector (PSD).

The PSD 250 is a two-dimensional PSD and therefore it records the spot positions in two dimensional space. The center C of the PSD 250 is at coordinates (0,0). As the PSD 250 is moved to the distal position, the center of rotation C is moved to coordinates (H, V) where H refers to the horizontal coordinate and V refers to vertical coordinate. The angular displacements of the rotational axis with respect to the precision flat surface 175 may be determined as:

$$\Theta_H = H/L \quad (1)$$

$$\Theta_v = V/L \quad (2)$$

where L is the distance between the PSD 250 at the distal position to the collimator inside the optical axis adjuster 130.

Figure 6:
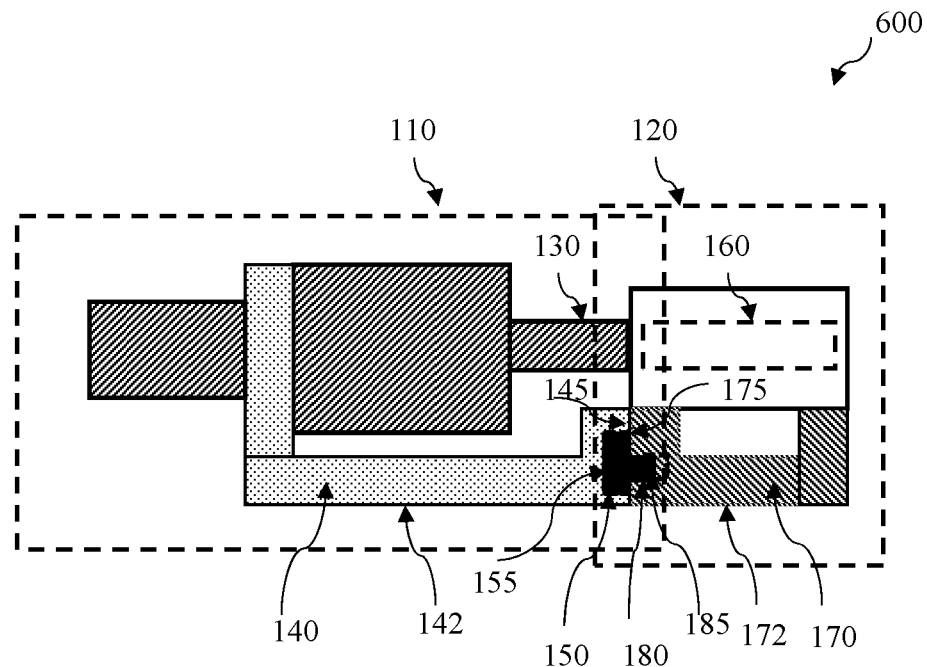
FIG. 6 is a diagram illustrating alignment of the first and second optical axes.

FIG. 6 is a diagram illustrating alignment 600 of the first and second optical axes in the third step. In the third step, the first and second optical components are clamped together such that their precision flat surfaces 145 and 175 directly face each other. These two surfaces are moved relative to each other on their surfaces in a sliding movement until the two optical axes are sufficiently collinear.

The first adjustment key 155 is inserted into the first key slot 150 and the second adjustment key 185 is inserted into the second key slot 180. The adjustments may be performed using fine pitch alignment screws.

Figure 7:
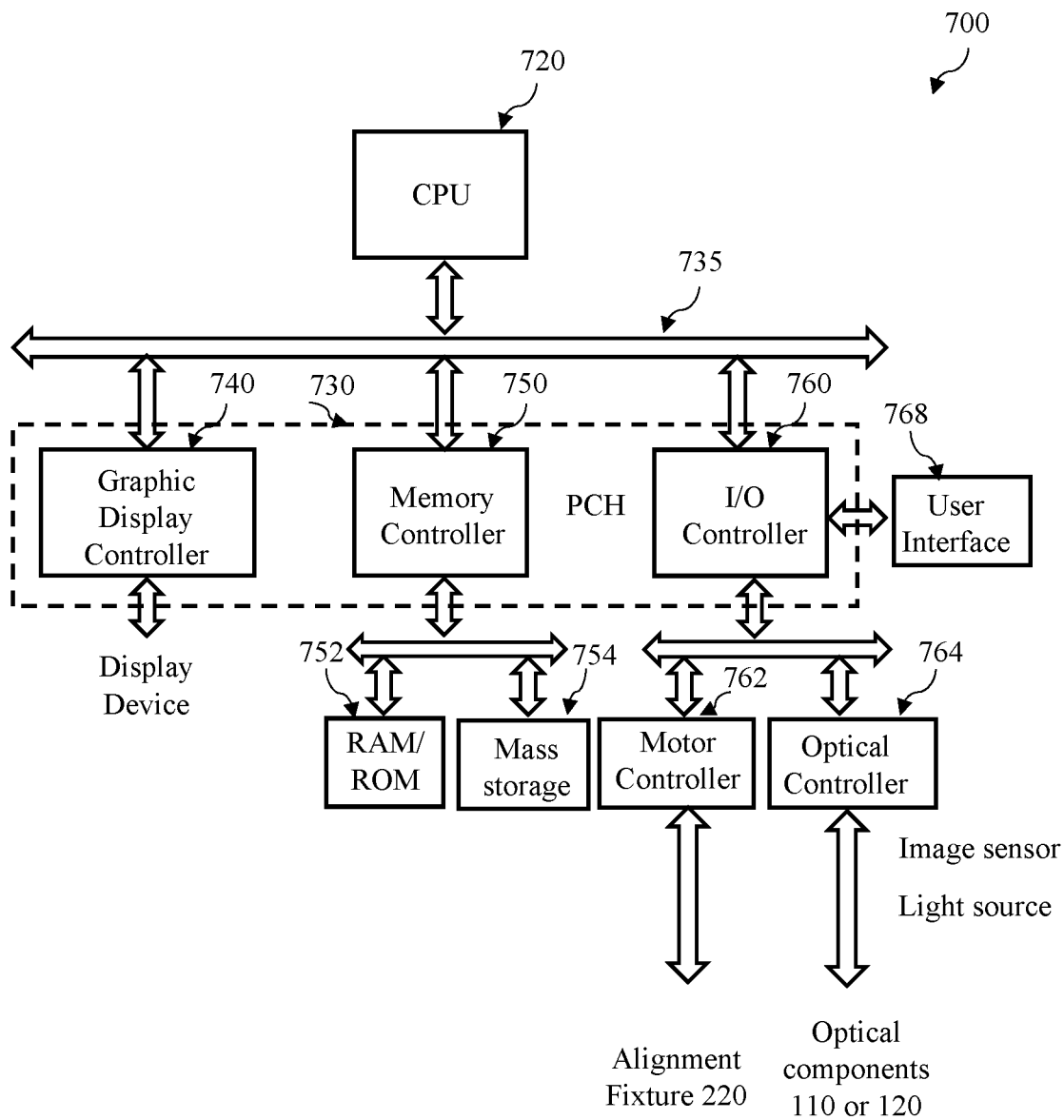
FIG. 7 is a diagram illustrating a system with controller for optical alignment of fiber-optic rotary joint assembly.

FIG. 7 is a diagram illustrating a system 700 with controller for optical alignment of fiber-optic rotary joint assembly. The system 700 illustrates an alignment controller to control the alignment procedure shown in FIGS. 3A, 3B, 4A, 4B, and 6.

The system 700 includes a central processing unit (CPU) or a processor 720, a platform controller hub (PCH) 730, and a bus 735. The PCH 730 may include an input/output (I/O) controller 760, a memory controller 750, a graphic display controller (GDC) 740, and a mass storage controller 754. The processing unit 720 may include more or less than the above components. In addition, a component may be integrated into another component. As shown in FIG. 7, all the controllers 740, 750, and 760 are integrated in the PCH 730. The integration may be partial and/or overlapped. For example, the GDC 740 may be integrated into the CPU 720, the I/O controller 760 and the memory controller 750 may be integrated into one single controller, etc.

The CPU or processor 720 is a programmable device that may execute a program or a collection of instructions to carry out a task. It may be a general-purpose processor, a digital signal processor, a microcontroller, or a specially designed processor such as one design from Applications Specific Integrated Circuit (ASIC). It may include a single core or multiple cores. Each core may have multi-way multi-threading. The CPU 720 may have simultaneous multithreading feature to further exploit the parallelism due to multiple threads across the multiple cores. In addition, the CPU 720 may have internal caches at multiple levels.

The bus 735 may be any suitable bus connecting the CPU 7200 to other devices, including the PCH 730. For example, the bus 735 may be a Direct Media Interface (DMI).

The PCH 730 in a highly integrated chipset that includes many functionalities to provide interface to several devices such as memory devices, input/output devices, storage devices, network devices, etc.

The I/O controller 760 controls input devices (e.g., stylus, keyboard, and mouse, microphone, image sensor) and output devices (e.g., audio devices, speaker, scanner, printer). It also has interface to a network interface card which provides interface to a network and wireless controller (not shown).

The memory controller 750 controls memory devices such as the random access memory (RAM) 752, the read-only memory (ROM) 752, and other types of memory such as the cache memory and flash memory. The RAM 752 may store instructions or programs, loaded from a mass storage device, that, when executed by the CPU 720, cause the CPU 270 to perform operations as described above, such as aligning operations. It may also store data used in the operations, including the PSD spot positions data. The ROM 752 may include instructions, programs, constants, or data that are maintained whether it is powered or not.

The GDC 740 controls a display device and provides graphical operations. It may be integrated inside the CPU 720. It typically has a graphical user interface (GUI) to allow interactions with a user who may send a command or activate a function.

The mass storage controller 754 controls the mass storage devices such as CD-ROM and hard disk.

The I/O controller 760 may include a motor controller 762 and an optical controller 764. The motor controller 762 may be a stepper motor controller or any controller that can control movement of a device such as the mount stage 220 of the alignment fixture 200. It may also control the optical axis adjusters 130 and 160, or the screws or the adjustment keys 155 and 185. The optical controller 764 performs control functions related to the optical components, such as emitting light from a light source to the collimator, moving the PSD 250, recording the spot positions, performing calculations of the angles in equations (1) and (2), etc.

Additional devices or bus interfaces may be available for interconnections and/or expansion. Some examples may include the Peripheral Component Interconnect Express (PCIe) bus, the Universal Serial Bus (USB), etc.

All or part of an embodiment may be implemented by various means depending on applications according to particular features, functions. These means may include hardware, software, or firmware, or any combination thereof. A hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An apparatus comprising:
a first optical component having a first optical axis, a first optical axis adjuster, and a first base element having a first precision surface;
a second optical component having a second optical axis, a second optical axis adjuster, and a second base element having a second precision surface adapted to slidingly mate with the first precision surface with a predetermined range of motion;
a first collimator located inside the first optical axis adjuster, wherein the first optical axis adjuster adjusts at least one of a pitch and a yaw angles and the translational displacements of the first collimator for the first optical axis to assume a first optical position with respect to the first precision surface;
a second collimator located inside the second optical axis adjuster, wherein the second optical axis adjuster adjusts at least one of a pitch and yaw angles of the second collimator for the second optical axis to assume a second optical position with respect to the second precision surface;
a mount stage for adjustably clamping the first precision surface and the second precision surface, such that the first precision surface and the second precision surface may each be independently moved in a single plane;
a communication pathway for communication between a light source and at least one of the first collimator or second collimator; and
a detector movably mounted to the mount stage such that the detector may be moved from a proximal position to a distal position, and vice versa, parallel to the surface of the mount stage,
wherein adjusting the first optical axis to be at the first optical position includes emitting light through the first collimator onto the detector and recording positions of a spot of the light incident on the detector as the detector is moved from the proximal position to the distal position, followed by determining horizontal and vertical angular displacements that correspond to the first optical position, and moving the collimator based on the horizontal and vertical angular displacements to bring the first optical axis to the first optical position.

2. The apparatus according to claim 1, wherein the second optical position parameters are derived from the first optical position parameters and from the slidingly mating specifics of the first precision surface with the second precision surface.

3. The apparatus according to claim 1, wherein the predetermined range of motion between the first precision surface and the second precision surface is sufficient to bring the first optical axis in the collinear geometric relation with the second optical axis while the first precision surface is slidingly mated with the second precision surface.

4. The apparatus according to claim 1, wherein the first optical component is a rotating unit and the second optical component is a stationary unit.

5. The apparatus according to claim 1, wherein both the first optical component and the second optical component are stationary units.

6. The apparatus according to claim 1, wherein the first optical axis adjuster is configured and adapted to: adjust the position of the first optical axis to minimize a radius of a trace of a spot position of a light incident on a position sensitive detector (PSD) when light is emitted through the collimator of the first optical component onto the PSD.

7. The apparatus according to claim 1, wherein the second precision surface is a flat surface that is adapted to slidingly join together with the first precision surface that is a flat surface in two orthogonal transverse directions.

8. An apparatus comprising:
a first optical component having a first optical axis, a first optical axis adjuster, and a first base element having a first precision surface; and
a second optical component having a second optical axis, a second optical axis adjuster, and a second base element having a second precision surface adapted to slidingly mate with the first precision surface with a predetermined range of motion,
a first collimator located inside the first optical axis adjuster, wherein the first optical axis adjuster adjusts at least one of a pitch and a yaw angles and the translational displacements of the first collimator for the first optical axis to assume a first optical position with respect to the first precision surface;
a second collimator located inside the second optical axis adjuster, wherein the second optical axis adjusts at least one of a pitch and yaw angles of the second collimator for the second optical axis to assume a second optical position with respect to the second precision surface;
a mount stage for adjustably clamping the first precision surface and the second precision surface, such that the first precision surface and the second precision surface may each be independently moved in a single plane;
a communication pathway for communication between a light source and at least one of the first collimator or second collimator; and
a detector movably mounted to the mount stage such that the detector may be moved from a proximal position to a distal position, and vice versa, parallel to the surface of the mount stage,
wherein the second precision surface is a flat surface that is adapted to slidingly mate with the first precision surface that is a flat surface and the flat surface of the first precision surface and flat surface of the second precision surface are in the same plane.

9. The apparatus according to claim 8, wherein the slidingly mate motion includes independent movement of the first precision surface and the second precision surface, both in a single plane, and
wherein adjusting the first optical axis to be at the first optical position comprises:
clamping the first precision surface against a precision surface of a mount stage;
emitting light through the collimator of the first optical component onto a detector on the mount stage movable on a surface of a base which is moved from a proximal position to a distal position;
recording positions of a spot of the light emitted on the detector as the mount stage is moved from the proximal position to the distal position or vice versa;
determining horizontal and vertical angular displacements that correspond to the first optical position; and
moving the collimator based on the horizontal and vertical angular displacements to bring the first optical axis to the first optical position.

10. The apparatus according to claim 8, wherein the second optical position parameters are derived from the first optical position parameters and from the slidingly mating specifics of the first precision surface with the second precision surface.

11. The apparatus according to claim 8, wherein the predetermined range of motion between the first precision surface and the second precision surface is sufficient to bring the first optical axis in the collinear geometric relation with the second optical axis while the first precision surface is slidingly mated with the second precision surface.

12. The apparatus according to claim 8, wherein the first optical component is a rotating unit and the second optical component is a stationary unit.

13. The apparatus according to claim 8, wherein both the first optical component and the second optical component are stationary units.

14. The apparatus according to claim 8, wherein the first optical axis adjuster is configured and adapted to: adjust the position of the first optical axis to minimize a radius of a trace of a spot position of a light incident on a position sensitive detector (PSD) when light is emitted through the collimator of the first optical component onto the PSD.

* * * * *